Oct. 16, 1951 J. B. SINGEL 2,571,957

SINGLE SIDE BAND DEMODULATOR SYSTEM

Filed Nov. 2, 1946 2 SHEETS—SHEET 1

WITNESSES:
E. A. McCloskey.
Wm. C. Groome

INVENTOR
John B. Singel.
BY C. L. Freedman
ATTORNEY

SINGLE SIDE BAND DEMODULATOR SYSTEM

Filed Nov. 2, 1946 2 SHEETS—SHEET 2

WITNESSES:
E. A. McCloskey.
Wm. C. Groome

INVENTOR
John B. Singel.
BY C. L. Freedman
ATTORNEY

Patented Oct. 16, 1951 2,571,957

UNITED STATES PATENT OFFICE 2,571,957

SINGLE SIDE-BAND DEMODULATOR SYSTEM

John B. Singel, Catonsville, Md., assignor to Westinghouse Electric Corporation, East Pittsburgh, Pa., a corporation of Pennsylvania Application November 2, 1946, Serial No. 707,478

1 Claim. (Cl. 250—20)

This invention relates to signalling systems and it has particular relation to systems for transmitting and receiving single-sideband signals.

Systems for transmitting and receiving single-side-band signals have certain advantages over other systems. For a discussion of such systems, reference may be made to articles by R. C. Cheek which appear in the "Westinghouse Engineer," March 1945 and November 1945. The "Westinghouse Engineer" is a publication of the Westinghouse Electric Corporation of Pittsburgh, Pennsylvania. Single-sideband signals may be transmitted or propagated over conductors or through space. The signals may be employed for communication purposes, entertainment purposes, relaying, telemetering, supervisory control or any other desired purpose.

In accordance with the invention, a single-sideband system is provided which requires a minimum of highly stable oscillators or high-frequency generators. In a preferred embodiment of the invention, a demodulator is employed which has a push-pull input stage. Single-sideband signals are applied to the stage in such phase as to cancel in the output circuit of the stage. A high-frequency oscillation is applied to the stage in a certain phase for the purpose of demodulating the single-sideband signals. The amplitudes of the inputs to the push-pull stage are selected to provide a highly effective volume control which operates without time delay. If a conventional superheterodyne receiver is converted for single-sideband reception, and if it is located adjacent to a single-sideband transmitter, the high-frequency oscillation for the demodulator is obtained by mixing a portion of the outputs of the local oscillator of the superheterodyne receiver and the carrier oscillator of the transmitter.

It is, therefore, an object of the invention to provide an improved single-sideband signalling system.

It is a further object of the invention to provide a single-sideband receiver having a local oscillator for converting the single-sideband signal to an intermediate frequency, and having means for mixing a portion of the output of the local oscillator with a stable frequency to provide a resultant frequency which varies with the frequency of the local oscillator.

It is an additional object of the invention to provide a demodulator for single-sideband signals which is energized from a source of local oscillations and which has substantially a zero output when energized by single sideband signals alone.

It is a still further object of the invention to provide a single-sideband receiver including a mixer for mixing an incoming single-sideband signal with a source of local oscillation and wherein the mixed quantities have amplitudes selected to provide effective limiting or automatic volume control.

It is also an object of the invention to provide an improved method for transmitting and receiving single-sideband signals.

A further object of my invention is to provide a method for synchronizing the frequency determining oscillator at one communicated station with the frequency determining oscillator at another station.

An additional object of my invention is to provide a demodulator for reception simultaneously of several frequencies (produced as a resultant with a plurality of audio frequencies) and deriving from the several frequencies the original audio frequencies while suppressing audio frequencies due to interaction between the several frequencies.

An ancillary object of my invention is to provide a balanced demodulator which shall operate to suppress undesired oscillations arising from inequalities in the homologous components of the demodulator.

Other objects will be apparent from the following discussion taken in conjunction with the accompanying drawings, in which.

Figure 1:
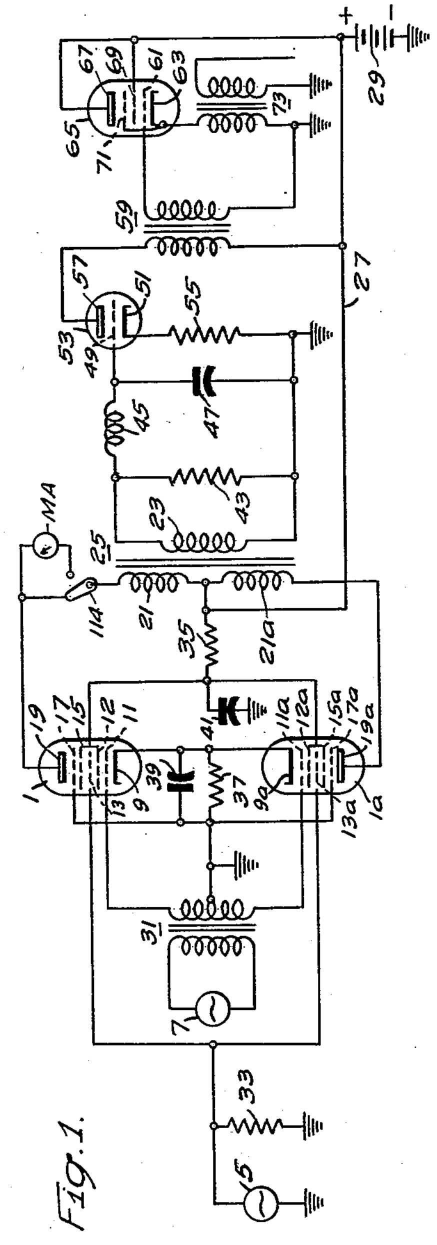
Figure 1 is a schematic view of a demodulator embodying the invention.

Referring to the drawings, Fig. 1 shows a pair of tubes 1 and 1a which are arranged in a push-pull circuit for the purpose of mixing a single-sideband signal derived from a source 5 with a locally-generated oscillation derived from a source 7 for the purpose of demodulating the single-sideband signal. Although any suitable mixer or converter tubes may be employed as the tubes 1 and 1a, certain advantages are derived from the utilization of tubes which have electron-coupled sections associated with the sources 5 and 7. As representative of such tubes, reference may be made to pentagrid tubes. Satisfactory results have been obtained from demodulators employing pentagrid tubes of the 6SA7 type.

The tube 1 has a cathode 9 which may be heated in any suitable manner for the purpose of establishing a source of electrons. Spaced in succession from the cathode 9 are grids 11, 12, 13, 15 and 17 and an anode 19. In a similar manner, the tube 1a includes a cathode 9a, grids 11a, 12a, 13a, 15a and 17a and an anode 19a.

The anodes 19 and 19a are connected to the primary terminals of a split primary transformer comprising primary windings 21 and 21a. These windings are associated with a common secondary winding 23 to constitute a coupling transformer 25. Adjacent terminals of the windings 21 and 21a are connected through a conductor 27 to the positive terminal of a source of direct voltage represented by a battery 29. The negative terminal of the battery is connected to ground.

Excitation for the first grids 11 and 11a of the tubes is derived from the source 7 through a coupling transformer 31. The terminals of the secondary winding of the transformer 31 are connected to the grids 11 and 11a, and the secondary winding is provided with a grounded center-tap. By inspection of Fig. 1, it will be observed that outputs from the tubes 1 and 1a which are derived from the source 7 alone are added in the secondary winding of the transformer 25. This is for the reason that the inputs from the source 7 are applied to the grids 11 and 11a in opposite phase relative to ground. In operation, the grids 11 and 12 and the grids 11a and 12a may be said to cooperate with their respective cathodes to establish "virtual cathodes" in the tubes 1 and 1a.

Single-sideband signals from the source 5, represented by the drop across a resistor 33, are applied in phase to the control grids 13 and 13a of the tubes. Since these signals are applied in phase to the grids of the two tubes, it follows that the outputs corresponding to these signals alone cancel in the transformer 25. If the tubes 1 and 1a and associated circuit components are properly balanced, no resultant output is derived from the push-pull stage as a result of energization of the tubes by the single-sideband source 5 alone.

For shielding the grid 13 from the remaining elements of the tube, shielding or screen grids 12 and 15 are connected through a suitable resistor 35 to the positive terminal of the battery 29. Similarly, the control grid 13a is shielded by shielding grids 12a and 15a which are connected through the resistor 35 to the positive terminal of the battery 29. The cathodes 9 and 9a are connected to ground through a cathode resistor 37 which has a by-pass capacitor 39 thereacross. A bypass capacitor 41 connects the shielding grids to ground.

Impedance of the transformer 25 is matched to the tubes 1 and 1a by means of a suitable matching resistor 43. The output of the secondary winding 23 is applied through a low-pass filter represented by an inductor 45 and a capacitor 47 across the grid 49 and cathode 51 of a suitable amplifying tube 53. Any suitable amplifying tube, such as a type 6J5, may be employed. It will be noted that the cathode 51 is connected to ground through a suitable resistor 55.

The anode 57 of the tube 53 is connected through the primary winding of a coupling transformer 59 to the positive terminal of the battery 29. The secondary winding of the transformer 59 is connected across the control grid 61 and cathode 63 of an amplifier tube 65. The tube 65 has an anode 67 and a screen grid 69 connected to the positive terminal of the battery 29. A suppressor grid 71 is connected to the cathode 63. Various conventional amplifier tubes may be employed as the tube 65. For example, a type 25L6 tube is suitable.

The amplified output from the demodulator may be obtained from the tube 65 in any conventional manner. As shown in Fig. 1, a cathode coupling is employed wherein the primary winding of a transformer 73 is connected between the cathode 63 and ground. The output of the secondary winding of the cathode 73 may be employed for energizing any suitable translating means.

As previously explained, no output appears across the secondary winding 23 as a result of energization of the demodulator by the source 5 alone (i. e. with the source 7 disconnected). This is desirable for the reason that the source 5 may include several components which differ in frequency from each other by amounts which represent audio-frequencies such as occur in speech. Consequently, intermodulation products of these components would have frequencies capable of passing through the low pass filter represented by the inductor 45 and the capacitor 47. However, since these intermodulation products cannot appear substantially in the secondary winding 23, the filter may be of simple design.

In order to explain further the operation of the demodulator, let it be assumed that the source 5 applies to the control grids 13 and 13a a single-sideband signal having a frequency of 260 kilocycles per second. Let it be assumed further that the source 7 applies to the grids 11 and 11a an oscillation having a frequency of 261.5 kilocycles per second. The resultant output across the secondary winding 23 then contains components having frequencies of 261.5 kilocycles per second, 521.5 kilocycles per second and 1.5 kilocycles per second. If the tubes or transformer 25 are slightly unbalanced, a small amount of the initial single-sideband signal having a frequency of 260 kilocycles per second may appear across the secondary winding 23 and higher-order carrier frequencies also may be present.

It should be noted that the filter represented by the inductor 45 and the capacitor 47 merely has to segregate an audio signal having a frequency of 1.5 kilocycles per second from the remaining components having frequencies of 260 kilocycles per second or higher. Because of the great differences in frequencies between the signal to be passed and the components to be rejected, the filter may be of simple design.

For the best demodulation of single-sideband signals, it is desirable that the tubes 1 and 1a exhibit square-law detection characteristics. If tubes are employed, such as type 6SA7 tubes, which have variable-mu control grids 13 and 13a, square-law detection characteristics are obtained and satisfactory demodulation of single-sideband signals is assured.

Figure 2:
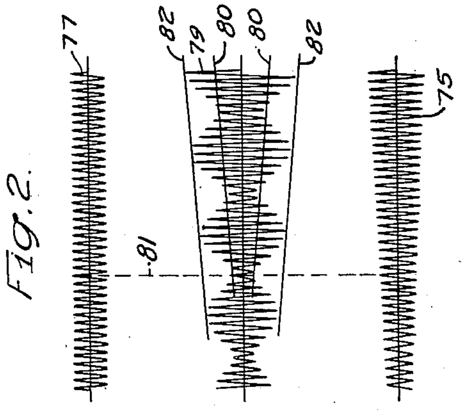
Fig. 2 is an oscillograph representing quantities which may be present in the demodulator of Fig. 1.

By proper selection of the amplitude of the input derived from one of the sources 5 or 7, an extremely effective volume control or limiter action can be obtained. This may be understood by reference to the oscillograms shown in Fig. 2, wherein three waves are plotted on coordinates having abscissae representing time, and ordinates representing amplitudes of the waves. Fig. 2 shows a constant-frequency single-sideband wave or signal 75 which varies in amplitude from zero to any value greater than the amplitude of a wave or signal 77. The source 7 of Fig. 1 may provide constant-frequency, constant-amplitude carrier signal 77 which differs in frequency from the single-sideband signal 75 (derived from the source 5 of Fig. 1) by an audio-frequency. The two waves, 75 and 77, when combined are represented by a resultant wave 79, which is characteristic of a combination waveform composed of one carrier and one sideband. The audio frequency appears as the envelope of the combination waveform, which is somewhat similar to a wavefrom having one carrier and two sidebands. However, in the latter case the edge of the envelope is sinusoidal, and requires a linear detector for distortionless demodulation. In the case of one carrier and one sideband, the envelope is not sinusoidal but has a scalloped shape. A square-law detector provides distortionless demodulation of the wave 79. At a point 81 the amplitudes of the waves 75 and 77 are equal. This corresponds to 100% modulation, and at this point, the scallops in the wave 79 reach very nearly their maximum value. These peaks of the scallops lie between the curves 80 and 82 which diverge at a low rate. These curves 80 and 82 correspond to the characteristic of the demodulator (curve 83, Fig. 3) in the saturation region. This curve is discussed below. Continued increase in amplitude of the curve 75 does not result in a marked increase in the amplitude of the scallops even though the overall amplitude increases and the percentage modulation decreases.

By analogy to a transmitting system, it is customary to consider the signal having the greater amplitude as the "carrier," and the signal having the smaller amplitude as the "sideband." Therefore, to the left of the point 81, the wave 77 may be considered as the "carrier" and the wave 75 as the "sideband." To the right of point 81, the wave 75 may be considered as the "carrier" and the wave 77 as the "sideband." Variations in amplitude of the "sideband" produce proportional variations in the amplitude of the audio output. To the left of the point 81, the scallops in the composite wave (the percent modulations) increase gradually because the amplitude of the "sideband" 75 increases gradually. To the right of point 81, the scallops remain constant because the amplitude of the "sideband" 77 remains constant.

In actual practice I have found that a 20 db amplitude increase above the point 81 in the "carrier" 75 results in an audio output increase of only 6 db. Further increase in amplitude of the "carrier" 75 results in no increase in audio output.

Figure 3:
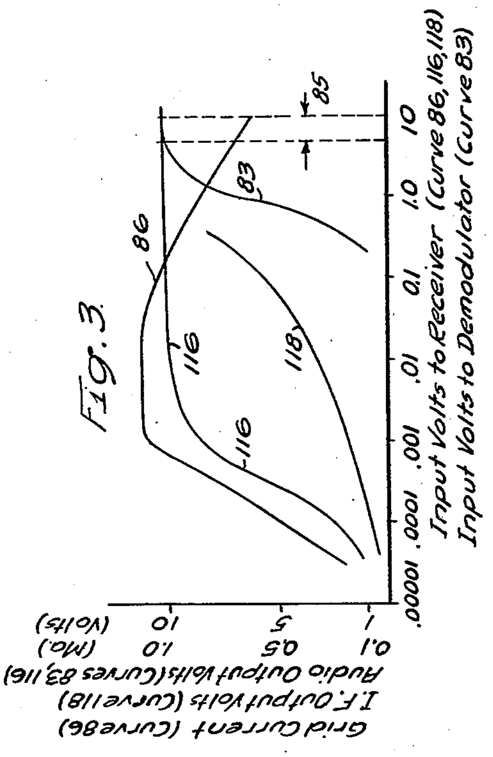
Fig. 3 is a graphical representation having logarithmic abscissae and linear ordinates of certain characteristics of the demodulator of Fig. 1.

In practice, very satisfactory results have been obtained by applying to the grids 11 and 11*a* of the type 6SA7 tubes a constant frequency input having an amplitude in the order of 1 volt root-mean-square. If the single sideband signals applied to the grids 13 and 13*a* have amplitudes in excess of about 10 volts root-mean-square, the input to the tube 53 is maintained constant within very close limits. This is shown in Fig. 3 by a curve 83. Ordinates for the curve 83 are linear and represent the audio output voltage from the demodulator; the logarithmic abscissae represent the single-sideband input voltage to the demodulator.

In practice the demodulator is so set that the point 81 of Fig. 3 is located approximately in the middle of the curve 83, and the top of the curve 83 in the region 85 is 10 db above the point 81 (as measured along the abscissa). The region 85 is in practice only 3 db above the middle of curve 83, as measured along the ordinate. The region 85 represents the maximum audio output from the demodulator stage and it follows that by proper selection of the amplitude of the wave 77, the excitation of the tube 53 (Fig. 1) may be held substantially constant even though the wave 75 increases several times in amplitude beyond this region. This volume control action is instantaneous and automatic because it is inherent in the system. It may be employed either alone or in conjunction with a conventional automatic volume control circuit in the preceding single sideband IF and/or RF stages. In spite of the fact that the modulator tubes are operated in their saturation region, in accordance with my invention, I have found that the distortion is below the limit permitted for commercial apparatus (below 5%).

For average operation the system is so adjusted that the incoming signals swing both above and below the region 85 indicated in Fig. 3 by arrows which is adjacent the "knee" of the curve. Substantially constant audio output due to the demodulator alone can be achieved by proportioning the input signal swing to remain on the right of region 85. This tends to smooth out the variations of amplitude due to the syllables of speech, but has substantially no effect on the intelligibility. However, operation in this region may be less desirable for music. If music is to be received by the demodulator, it may be desirable to operate with a signal swing located on the left of the region 85 to prevent the aforesaid volume control. Conversely, the same effect may be achieved by increasing the amplitude of the signal from the source 7, and readjusting the amplifiers 53 and 65 to operate at the new signal level. The volume control herein discussed does not create audio harmonic distortion.

Normal operation with a signal from the source 5 is always sufficient to cause the grids 13 and 13*a* to draw current, which does not become large enough to damage the tubes. In Fig. 3, a curve 86 shows the grid current as a function of the incoming signal amplitude. The grid current is limited as shown by the flat portion of the curve and decreases as the signal increases within the normal operating range because of the relationship between the potentials on the grids 13 and 13*a* and the potentials on the grids surrounding the latter.

I have found that with the resistance in the input source 5 low, distortion from grid current is negligible.

By inspection of Fig. 1, it will be observed that in addition to the source of single-sideband signals an additional oscillator or generator of high-frequency oscillations 7 must be provided. This source must have good frequency stability to assure proper demodulation of an incoming single-sideband signal.

In some cases, the demodulator of Fig. 1 will be employed with a superheterodyne receiver which was previously utilized for receiving double-sideband signals. Furthermore, the demodulator generally will be located adjacent a single-sideband transmitter having a carrier frequency oscillator associated therewith. By suitable association of the local oscillator of the superheterodyne receiver with the carrier frequency oscillator of the transmitter, a resultant oscillation may be obtained which can be utilized for energizing the grids 11 and 11*a* of the demodulator. The resultant system is illustrated in Fig. 4.

Figure 4:
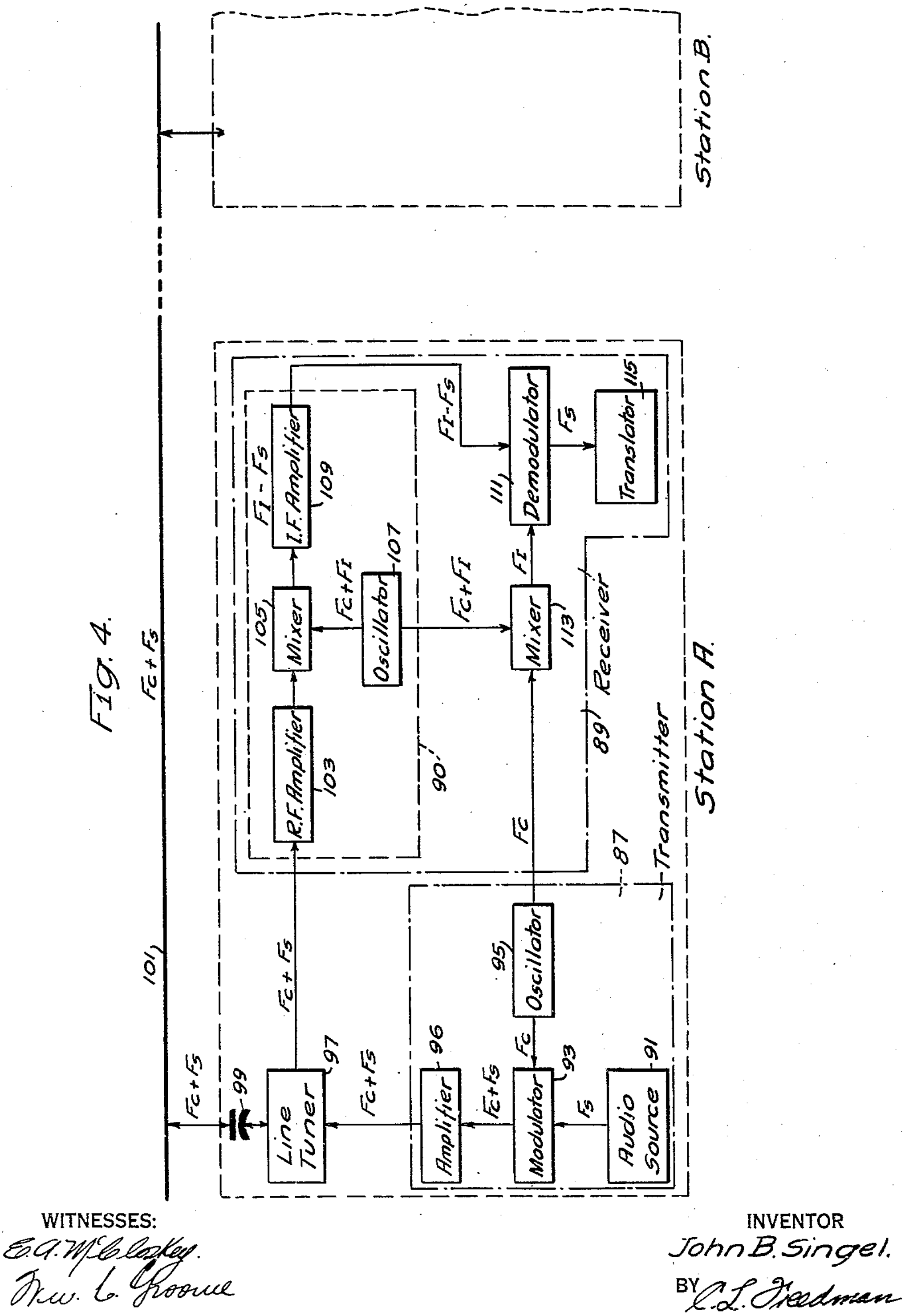
Fig. 4 is a block diagram of a single sideband system embodying the invention.

In Fig. 4, two stations A and B are illustrated, each of which includes a transmitter 87 and a receiver 89. Since the equipment at each of the stations is identical, the equipment will be discussed with reference to the station A alone.

The transmitter 87 includes a source 91 for generating a signal which is to be transmitted to station B. This signal may be a video-signal or an audio-signal of any desired type. For the purpose of discussion, it will be assumed that the source 91 supplies an audio signal Fs to a modulator 93.

The modulator 93 also receives an oscillation Fc of carrier frequency from an oscillator 95. If desired, the modulator 93 may be of the type discussed in the aforesaid Cheek articles or in the Lenehan application, Serial No. 623,594, filed October 20, 1945, now Patent No. 2,476,880 granted July 19, 1949, and assigned to the same assignee. This modulator 93 has a single-sideband output which may represent the upper sideband Fc+Fs or the lower sideband Fc—Fs. For the purpose of discussion, it will be assumed that the modulator 93 supplies the upper sideband to an amplifier 96. The output of the amplifier 96 is applied to a conventional line tuner 97 which is utilized for matching the impedance of the transmitter to that of the associated transmission line 101. A conventional coupling capacitor 99 is interposed between the line tuner and a transmission line 101 over which the single-sideband signal is to be transmitted.

It will be understood that similar transmitter equipment is provided at station B for transmitting signals over the transmission line 101 to station A. Such signals enter station A through the coupling capacitor 99 and the line tuner 97 and are applied to the receiver 89.

If a conventional superheterodyne receiver 99 is available, it may be employed as part of the receiver 89. The components of the superheterodyne receiver which are employed include a radio frequency amplifier 103, a mixer 105, a local oscillator 107 and an intermediate-frequency amplifier 109. If desired, the components may include a conventional automatic volume control.

The single-sideband signal Fc+Fs which is received from station B is amplified in the radio frequency amplifier 103. The amplified signal then is mixed in the mixer 105 with the output of the local oscillator 107. As is well understood in the art, the local oscillator 107 may have a frequency Fc+FI wherein FI is the intermediate frequency of the amplifier 109. The output of the mixer FI—Fs then is applied in a conventional manner to the intermediate frequency amplifier for amplification to a level suitable for a demodulator 111. This demodulator may be similar to that illustrated in Fig. 1 and the output of the intermediate frequency amplifier 109 supplies the single-sideband signal represented by the source 5 of Fig. 1.

The receiver 89 generally will be located adjacent the transmitter 87 which has the highly stable oscillator 95 associated therewith. Consequently, a portion of the output of the oscillator 95 may be supplied together with a portion of the output of the oscillator 107 to a mixer 113 to provide an output FI having a frequency substantially equal to the frequency of the intermediate frequency amplifier 109. The oscillation FI derived from the mixer 113 is applied to the demodulator 111 and corresponds to the oscillation derived from the source 7 of Fig. 1. The demodulator then combines the oscillations FI and FI—Fs to provide the desired signal Fs which is utilized in any suitable translating means 115. The translating means may include relays, loudspeakers, measuring equipment or any other suitable mechanism which is responsive the signal Fs in a manner will understood in the art. Because of the previously discussed automatic volume control, the input to the translating means may be maintained within the capacity of the translating means despite substantial variations in amplitude of the received single sideband signal.

In order that the signal Fs, delivered by the demodulator 111 at station A, be exactly of the same frequency as the signal Fs originated by the source 91 at station B, the oscillators 95 at both stations A and B must be of the same frequency. This synchronization is accomplished by transmitting the unmodulated oscillation of the oscillator 95 from station B to station A for tune-up purposes only. At station A the demodulator 111 will have an audio output corresponding to the "beat" or difference between the frequencies of the sources 95. The frequency of the oscillator 95 at station A may then be adjusted towards zero beat by listening to the output of a loudspeaker or other aural device employed in the translating device 15, and adjusting the oscillator at station A. The oscillators are adjusted in this manner only to within approximately 50 cycles of each other since the ear is not sensitive to lower frequencies. The final adjustment is effected by temporarily connecting a direct-current milliammeter MA in series with one of the anodes 19 or 19*a*. A switch 114 is associated with the anode 19 for this purpose. When the difference in two frequencies is of the order of 50 cycles the milliammeter needle will deflect to a position corresponding to the average current and will remain at rest. As the adjusting knob of the oscillator is turned in the direction to decrease the beat frequency the needle will begin to fluctuate with the current because the peak frequency becomes sufficiently low so that the needle may follow it. The knob is now turned until the fluctuations stop. If the milliammeter needle stops fluctuating at a maximum reading, not only are the frequencies the same, but the phase is the same. Conversely, if the fluctuation of current in the anode 19 or 19*a* stops at a minimum reading, the frequencies are the same but the phase is in opposition, namely at 180 degrees. Either setting is satisfactory. Current readings between the maximum and minimum indicate an intermediate phase relation. By tests, it has been determined that differences in the frequencies of the source 95 at stations A and B of as much as 20 cycles cannot be detected in speech by the human ear. A frequency difference of 250 to 350 cycles is required before speech becomes unintelligible, although, of course in approaching this difference, the quality progressively deteriorates.

It should be noted that the oscillator 107 need not be highly stable. Any change in frequency of the oscillator changes the frequencies of the outputs of the mixer 113 and the intermediate frequency amplifier 109 in the same direction. Consequently, such variations in the frequency of the oscillator have no effect on the output of the demodulator 111. The oscillator 107 should have a stability sufficient to keep the quantity FI—Fs within the pass band of the amplifier 109. Such stability is required in all oscillators used in superheterodyne receivers.

From an inspection of Fig. 4, it is clear that to convert a conventional superheterodyne receiver for reception of single sideband signals only two units 113 and 111 must be provided, and only one highly stable oscillator is required for the entire station. The detector in the conventional receiver is also not used, whether it be of the diode, grid leak, power, or of any other rectifier form. Likewise any subsequent audio amplifiers are not used.

Referring again to Fig. 3, a curve 116 represents the audio output of the demodulator 111 (ordinates) plotted against the input to the receiver 89 (abscissae). The receiver for which these curves were plotted included a conventional automatic volume control operating on the grids of the intermediate frequency amplifier. A curve 118 shows the relationship between the output of the intermediate frequency amplifier (ordinates) and the sideband input to the receiver (abscissa) with the conventional automatic volume control in operation.

The system illustrated by Fig. 4 is similar to single frequency operation, wherein the suppressed carrier oscillations originating at sources 95 are of the same frequency for both stations A and B. For systems wherein suppressed carriers of different frequencies are employed for transmitting and receiving, an additional source 95 is required at each of the stations A and B. One source 95 then supplies the desired carrier to the modulator 93 whereas the other source supplies a different carrier to the mixer 113. This type of operation is similar to two-frequency operation. In each of the above cases if only TRF receivers are used, the output of the TRF receiver 103 and the output of oscillator 95 are fed directly into the demodulator 111. Thus, the mixer 105, the IF amplifier 109, the oscillator 107, and the mixer 113 are not required. With the exceptions herein set forth, the voltages and components of the receiver may be selected in accordance with conventional practice.

Although the invention has been described with reference to certain specific embodiments thereof, numerous other modifications are possible. All such modifications falling within the spirit and scope of the invention are intended to be covered by the appended claim.

I claim as my invention:

In a single sideband demodulator for combining two alternating quantities, a pair of tubes each having a cathode, an anode, and a pair of grid electrodes, a first source of substantially constant frequency alternating voltage, means for coupling said first source between a grid of one tube and a corresponding grid of the other tube, an alternating current single sideband signal source, means for coupling said signal source in parallel relation between the cathodes of said tubes and other corresponding grids thereof, an untuned output circuit coupled between the anodes of said tubes, the amplitude of the voltage from said first source being small compared to the amplitude of the voltage from the signal source.

JOHN B. SINGEL.

REFERENCES CITED

The following references are of record in the file of this patent:

UNITED STATES PATENTS

| Number | Name | Date |
|---|---|---|
| 1,958,027 | Wheeler | May 8, 1934 |
| 2,063,588 | Crosby | Dec. 8, 1936 |
| 2,095,050 | Beverage | Oct. 5, 1937 |
| 2,115,360 | Crosby | Apr. 26, 1938 |
| 2,129,020 | Murphy | Sept. 6, 1938 |
| 2,163,719 | Usselmann | June 27, 1939 |
| 2,201,016 | Usselmann | May 14, 1940 |
| 2,211,939 | Steimel et al. | Aug. 20, 1940 |
| 2,273,023 | De Bellescize | Feb. 17, 1942 |
| 2,295,615 | Tucker | Sept. 15, 1942 |
| 2,296,107 | Kimball | Sept. 15, 1942 |
| 2,363,835 | Crosby | Nov. 28, 1944 |
| 2,364,863 | McLaughlin | Dec. 12, 1944 |
| 2,424,971 | Davey | Aug. 5, 1947 |
| 2,441,127 | Atkins | May 11, 1948 |